United States Patent
Stueble

[11] Patent Number: 5,497,628
[45] Date of Patent: Mar. 12, 1996

[54] AIR CONDITIONING PROCESS AND DEVICE

[75] Inventor: Helmut Stueble, Spartanburg, S.C.

[73] Assignee: LTG Lufttechnische GmbH, Stuttgart, Germany

[21] Appl. No.: 282,967

[22] Filed: Jul. 29, 1994

[51] Int. Cl.⁶ ................................................ F25D 17/06
[52] U.S. Cl. ................................ 62/91; 62/171; 62/311; 165/20; 261/DIG. 34; 261/23.1; 261/129; 261/18.1
[58] Field of Search ........................ 62/304, 311, 312, 62/91, 92, 171; 165/19, 20; 236/44 B; 261/18.1, 23.1, 129, DIG. 34

[56] References Cited

U.S. PATENT DOCUMENTS

| | | |
|---|---|---|
| Re. 20,944 | 12/1938 | Baker . |
| 1,075,197 | 10/1913 | Cramer et al. . |
| 1,861,158 | 5/1932 | Hilger . |
| 2,044,352 | 8/1936 | Evans . |
| 2,187,905 | 1/1940 | Killingsworth . |
| 2,235,005 | 3/1941 | Ashley . |
| 2,254,185 | 8/1941 | Newton . |
| 2,290,465 | 7/1942 | Crawford ................................. 165/20 |
| 3,116,612 | 1/1964 | Pennington ............................. 62/311 |
| 4,540,118 | 9/1985 | Lortie et al. . |
| 4,552,303 | 11/1985 | Fisher et al. . |

Primary Examiner—John M. Sollecito
Attorney, Agent, or Firm—Dority & Manning

[57] ABSTRACT

The invention relates to an air-conditioning process and device, in particular to humidify and/or temper air which is fed in the form of an air stream to a humidification zone, whereby cooled water is sprayed into the airstream as a function of the conditioning parameters to be met. It is provided that to convey the air, the air stream is blown through the humidification zone, tempered water for adiabatic conditioning and cooled water can be sprayed in, and to influence the conditioning parameters, a control and/or regulation of the arrival of tempered and/or cooled water is carried out.

15 Claims, 3 Drawing Sheets

AIR CONDITIONING PROCESS AND DEVICE

BACKGROUND OF THE INVENTION

The instant invention relates to a process for air conditioning, in particular to humidify and/or temper air which is supplied in the form of an air stream to a humidification zone, whereby cooled water is sprayed into the air stream as a function of desired air conditioning parameters.

A process of the type mentioned above is known. If for instance air is removed from a room to be air-conditioned and is cooled and then fed to an air humidifier, air temperature and relative humidity of the air can thus be influenced in a desired manner in order to create the desired climate by means of the air fed back into the room. To control and regulate the air conditioning parameters (in particular temperature and relative air humidity) a method is known by which part of the air taken from the room is fed to a bypass which skips the humidification device (air washer). If a room sensor for example detects excessive air humidity or a room air temperature that is too low, the air to be blown into the room is mixed with air from the bypass, which means that the air supplied to the room consists of one part coming from the air humidifier and one part going through the bypass. The latter part is also called bypass air. The desired mixture ratio can be adjusted by means of suitable air throttles. The cooling of air mentioned above is effected by means of a heat exchanger which precedes the air humidifier or the bypass. To convey the air, a supply ventilator is provided which is upstream or downstream of the cooling apparatus. Furthermore a return ventilator is required which is located downstream of the air humidifier or the bypass and returns the conditioned air into the room. It is a disadvantage in the known process that the return ventilator produces energy which is added to the heat load occurring in the room. To compensate for this the total air fed to the room must be increased so as not to change the room air parameters. The increase of air mass may be in the area of a factor of 1.1 to 2. Overall, individual components will be larger and also more expensive as a result.

OBJECTS AND SUMMARY OF THE INVENTION

It is therefore a principal object of the instant invention to create a process of the type mentioned initially by means of which air-conditioning in a simple and inexpensive manner is possible. Additional objects and advantages will be set forth in part in the following description, or may be obvious from the description, or may be learned through practice of the invention.

The objects are attained through the invention in that the air stream is blown and/or sucked through the humidification zone to convey the air stream, in that tempered water for adiabatic conditioning and cooled water can be sprayed into the humidification zone and in that controls and/or regulation of the arrival of the tempered and/or cooled water is carried to influence the conditioning parameters. Due to the fact that the air stream is blown through the humidification zone and reaches a room to be air-conditioned, for instance, in this manner, the heat load produced by air transportation is not brought into the room but is diverted in the humidification zone. With the instant invention, the bypass known from the state of the art can furthermore be omitted as the influence of the air fed back into the room is not obtained by admixing bypass air, but through appropriate control or regulation of the supplied tempered and/or cooled water. The alternatives of feeding only tempered water or only cooled water or tempered as well as cooled water depend on the applicable state of operations, i.e. control or regulation may cause only tempered or only cooled water or tempered as well as cooled water to be supplied to the humidification zones at certain times. The temperature of the tempered water is selected so that it results substantially in adiabatic air-conditioning. Based on the process according to the invention, very narrow air-conditioning tolerances can be respected and it is furthermore possible to manage a very wide and varied spectrum of heat loads.

In a further development of the invention, the humidification zone has at least two areas of which each represents a partial cross-section, whereby the tempered water can be sprayed into one area for essentially adiabatic conditioning and whereby the cooled water or the water cooled in addition can be sprayed into the other area. In this manner the total air stream is divided into partial air streams by means of the areas. The partial air streams are treated accordingly and are then brought together again in the form of a conditioned total air stream and brought into the room.

In a further development of the invention, the air throughput to influence the conditioning parameters is adjustable. In addition to the water control or water regulation, control or regulation of air quantity is thus also provided. This air quantity regulation is however only possible if the room does not require a constant throughput of air.

It is especially advantageous if the air quantity of at least one of the parts of air throughput (partial air streams) constituted by the separate areas can be adjusted. If provisions are made for a division of the total air stream into several portions which are adjusted so that a decrease of one portion results in a corresponding increase of another portion, the total air quantity can be kept constant in this manner whereby the separate partial air streams are treated differently by means of tempered or cooled water.

In another embodiment of the invention, the quantity of the supplied cooled water is essentially constant and the quantity of tempered water supplied can be regulated. To maintain certain states of room air, an essentially constant adjustment of the cooled air being supplied is thus carried out. Changing magnitudes, e.g. changes in outside air due to weather conditions, are then influenced by controlling or regulating the tempered water.

Provisions are made in particular wherein the two types of water supplied (tempered and cooled water) are brought into the air stream by spraying. Provisions may in particular be made for the tempered water to be guided to the running wheel of an air-conveying ventilator. It is thereby broken down into the finest droplets, making it possible to achieve especially effective air humidification.

Advantageously the tempered water is guided to the running wheel of the ventilator and the cooled water is sprayed in downstream towards the running wheel and only in a partial cross-section, preferably only in one area. This causes first of all the entire cross-section to carry air treated with tempered water (as seen in the direction of air flow). At least two partial air streams are formed on the basis of corresponding partial cross-sections, whereby one partial cross-section carries a partial air stream treated with tempered water and the other partial cross-section carries a partial air stream which is treated with tempered water as well as also with cooled water.

The invention furthermore relates to a device for the conditioning, in particular the humidification and/or tempering of air, with an air humidifier to which a ventilator for the production of an air stream is attributed, whereby the ventilator, acting as an air conveyor, blows the air stream through the air humidifier, and is thus upstream of the air humidifier (as seen in the direction of air flow), and whereby the air humidifier is equipped with at least two spraying devices of which one can be supplied with tempered water for essentially adiabatic conditioning of the air and the other with cooled water, in each case depending on the command given by a control an/or regulating device.

Provisions are made in particular for the air humidifier to have at least two areas, each constituting a partial cross-section, and for one spraying device be attributed to one area and the other spraying device to the other area.

In an alternative embodiment, of the invention at least one of the spraying devices consists of spray nozzles or of one spray nozzle. It is however also possible for at least one of the spraying devices to be constituted by feeding the desired water on the running wheel of the ventilator. The water impacting the rotating running wheel is broken up into the finest droplets and thus easily and very intensively humidifies the air stream.

In a preferred embodiment of the invention, the control and/or regulating device is designed to adjust the supply of tempered and/or cooled water as a function of the condition of the air in the room to be air-conditioned and/or the condition of the outside air. The condition of the air of the room to be air-conditioned is essentially determined by the prevailing air temperature in the room and the relative humidity of the air. This also applies to the outside air which is also essentially characterized by its temperature and relative air humidity.

In a further development of the invention, the air humidifier is provided with at least one air throttle by means of which the air stream or at least a partial air stream available in a partial cross-section can be adjusted. The air throttle is preferably located upstream of the appertaining spraying device, as seen in the direction of air flow.

The drawings explain the invention through preferred embodiments thereof.

DETAILED DESCRIPTION OF THE PREFERRED EMBODIMENTS

Figure 1:
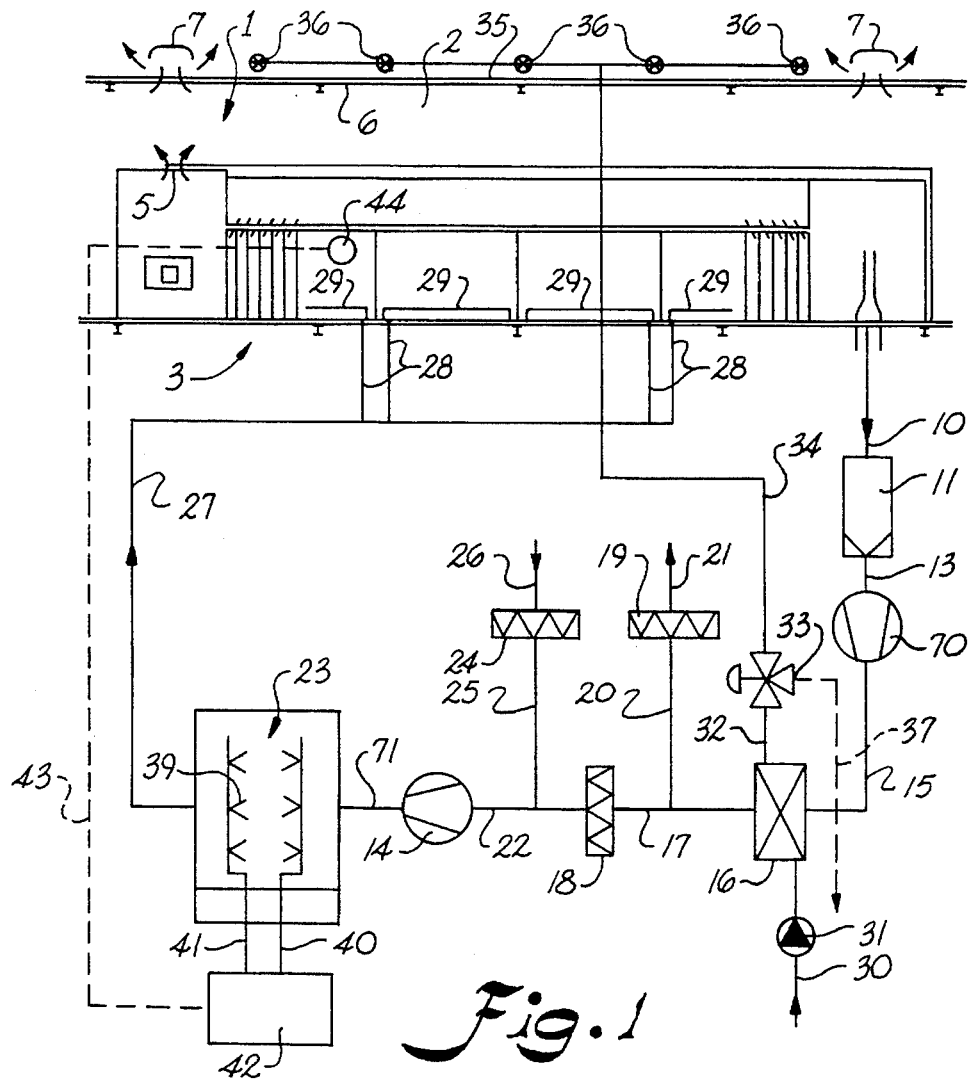
FIG. 1 shows a drawing of basic design of a room air conditioning installation.

Reference will now be made in detail to the presently preferred embodiments of the invention, one or more examples of which are illustrated in the drawings. Each example is provided by way of explanation of the invention, and not as a limitation of the invention. For example, features illustrated or described as part of one embodiment can be used with another embodiment to yield still a further embodiment.

FIG. 1 schematically shows a section of a building 1 with a room 2 in which at least one machine 3 is installed. The machine 3 may be a textile spinning machine, in particular an open-end spinning machine. Warm machine air collects in the machine housing 4 and emerges in part through an outlet 5 on the machine housing 4 to rise up to the ceiling 6 of the room 2 where it exits through roof exhauster 7 outside into the open air. Another portion of the hot machine exhaust air leaves the machine housing 4 through a channel 10 which leads to a filter 11, the output of which is connected to a channel 13 which is connected to a ventilator 70. A channel 15 connects the output of ventilator 70 to a heat exchanger 16. The output of the heat exchanger 16 on the air side is connected to a channel 17 which leads to an air throttle 18. An air throttle 19 is connected to channels 20 and 21 of which channel 20 is connected to channel 17 and channel 21 leads out into the open air. The other side of the air throttle 18 is connected to a channel 22 which leads to a ventilator 14. Ventilator 14 is connected via a channel 71 to an air humidifier 23. Furthermore an air throttle 24 is connected to channel 22 via a channel 25. Outside air can be fed in trough a channel 26 which leads to air throttle 24. The output side of the air humidifier 23 is connected to a channel 27 which is provided with bifurcations 28 leading to air outlets 29 which are located in the lower area of the machine 3.

A cooling medium, e.g. water, is fed via a conduit 30 and a pipe 31 to the heat exchanger 16. This cooling medium leaves the heat exchanger 16 through a conduit 32 to reach a three-way valve 33. One output of the three-way valve 33 leads to a conduit 34 which leads to the roof 35 of building 1 and is connected to outlet nozzles 36. Another output of the three-way valve 33 is connected to a conduit 37.

The air humidifier 23 is provided with two spraying devices 38 and 39 which are connected via conduits 40 and 41 to a control device 42. In another embodiment, the control device 41 can also be made in the form of a regulating device. The control device 42 is connected via a connection 43 to a sensor unit 44 which is located in room 2 at a suitable location, preferably in the machine 3, and determines the conditioning parameters for the air, in particular air temperature and/or relative air humidity.

In operation, the ventilator 70 sucks air through channel 10 which flows through filter 11 and heat exchanger 16. The heat exchanger cools the air which is then blown by ventilator 14 through the air humidifier 23. In the humidifier 23 the air is humidified and further cooled and is then fed back through channel 27 to the machine 3 in room 2. The water fed to the heat exchanger 16 and cooling the air goes through conduits 32 and 34 to the roof 35 of the building 1 where it evaporates and thereby cools room 2. In addition, or alternately, the water arriving from the heat exchanger 16 through conduit 37 can further be utilized, e.g. to produce hot steam for the operation of machine 3. By opening the air throttle 19, part of the air can be directed to the outside, insofar outside air is also brought into the circuit, e.g. by opening air throttle 24. This always occurs when the temperature and/or relative humidity of outside air is favorable to carrying out the process.

Water is fed through conduits 40 and 41 to the air humidifier, this water being partly cooled water (conduit 40) and partly water tempered so that an adiabatic process takes place in the air humidifier 23. Each supplied water quantity is determined in advance by the control device 42 as a function of the data (conditioning parameters of the room air) detected by the sensor device 44.

Figure 2:
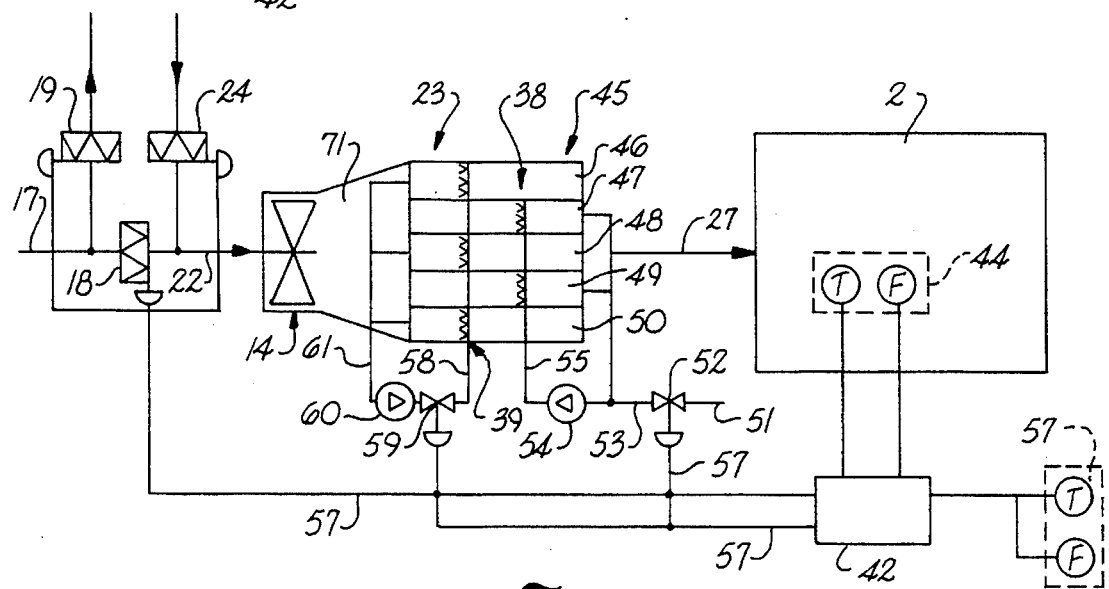
FIG. 2 shows an embodiment of an air humidifier.
Figure 3:
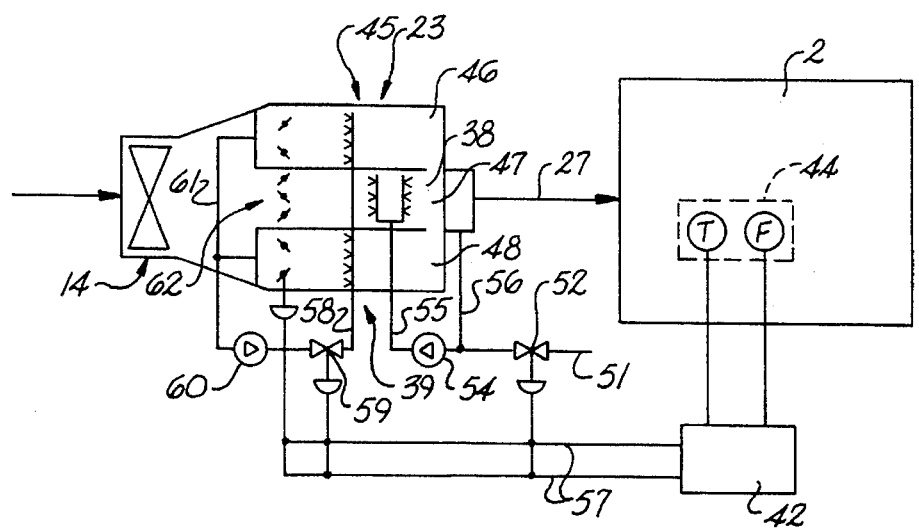
FIG. 3 shows another embodiment of an air humidifier.
Figure 4:
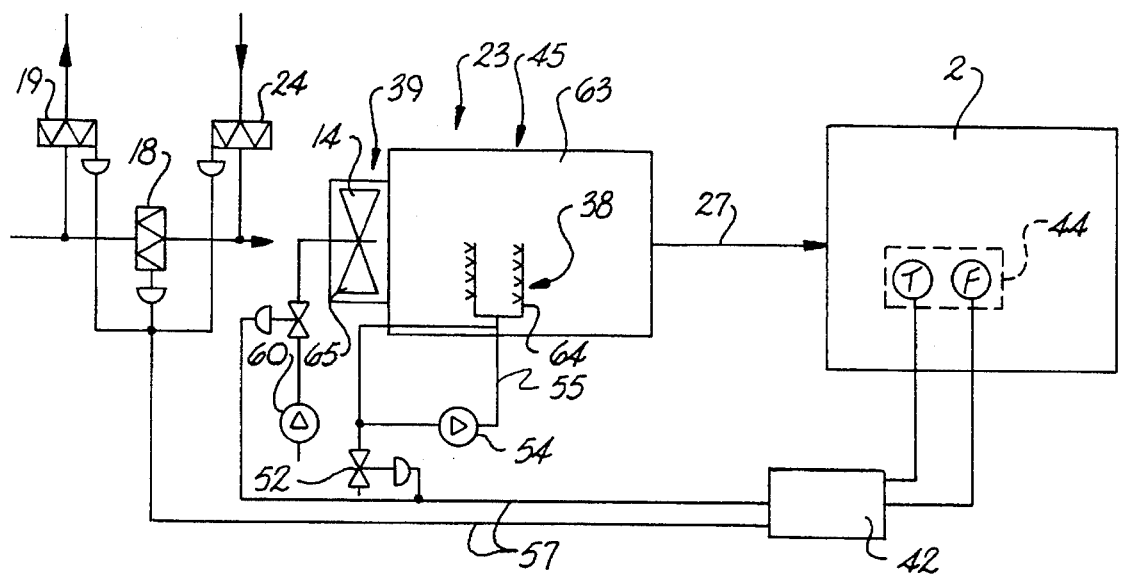
FIG. 4 shows yet another embodiment of an air humidifier.

FIGS. 2 to 4 schematically show different structural forms of the air humidifier 23. Appropriate components which have already been discussed in FIG. 1 are given the same reference numbers in FIGS. 2 to 4. The air flowing through air throttle 18 in channel 17 is fed through channel 22 to the ventilator 14 which then feeds the air to a humidification zone 45 of the air humidifier 23. The suitably conditioned, i.e. humidified and tempered air, then leaves the air humidifiers and goes via channel 27 into the room to be air-conditioned.

The humidification zone 45 has several areas 46 to 50 which constitute partial cross-section of the total cross-section of the humidification zone 45. The areas 46 and 48 enclose the area 47 between them, and the areas 48 and 50 enclose the area 49 between them. The spraying device 38 is assigned to the areas 47 and 49 and the spraying device 39 is assigned to the areas 46, 48 and 50. The spraying device 38 has several spray nozzles located in the areas 47 and 49. A corresponding arrangement applies to the spraying device 39 which has spray nozzles in areas 46, 48, and 50. The spraying device 38 is supplied by means of a conduit 51 which is connected to a cooling installation which is not shown, so that the cooled water is sprayed by the spray nozzles of the spraying device 38 into the air stream. The conduit 51 goes to a valve 52 which is connected to a conduit 53 and leads to a pump 54 which is connected to a conduit 55 which is connected to the spraying device 38. Sprayed, cooled water which is not carried along by the air stream is collected in areas 47 and 49 and is fed back through a conduit 56 to conduit 53. Valve 52 can be actuated via a connection 57 leading to the control device 42.

In room 2, in particular in the area of the machine 3, is the sensor device 44 which detects the air temperature T and the relative air humidity F and transmits data accordingly to the control device 42. An additional sensor device 57 which is located outside the building 1, i.e. in the open, detects the air temperature T and the relative humidity F of the outside air and also transmits data accordingly to the control device 42.

In the embodiment of FIG. 2 it is indicated that the areas 46 to 50 are separated from each other by separation walls. The separation walls extend preferably in the direction of air flow. It is however also possible for the individual areas 46 to 50 not to be physically separated from each other but rather merely constitute adjoining zones.

The spray nozzles of the spraying device 39 which are located in areas 46, 48 and 50 are connected to a conduit 58 which goes to a valve 59 which is connected to a pump 60 which is connected to conduits 61. The conduits 61 lead to corresponding collection areas of areas 46, 48 and 50 which catch the water which is not carried along by the air stream and which lead it back into the circuit. A supply line (not shown) can furthermore be connected to the conduits 61 to supply water from a reservoir. The tempered water has a temperature which is such that the air humidification process proceeds adiabatically in areas 46, 48 and 50. Valve 59 is connected via the previously mentioned connection 57 to the control device 42. It can furthermore be seen that the connection 57 is also connected to the air throttles 18, 19 and 24.

In operation the ventilator 14 blows the air stream through the humidification zone 45 of the air humidifier 23, whereby adiabatic conditioning with tempered water and conditioning with cooled water take place. The control device 42 influences the valves 152 and 59 in such a manner that the air stream fed to room 2 has the desired conditioning parameters, i.e. the desired temperature and also the desired relative air humidity. In another special embodiment it is also possible for an adjustment of the air throttles 18 and/or 19 and/or 24 to take place simultaneously so that in addition to "water control" a control of the air quantity is also carried out.

FIG. 3 shows another embodiment which is substantially the same as that of FIG. 2, but in which several components shown in FIG. 2 have been left out for the sake of simplification. Only the difference in design of the humidification zone 45 of the air humidifier 23 shall be discussed below. In the embodiment of FIG. 3, only two areas 46 and 48 are provided. Between these two areas 46 and 48 is area 47 into which cooled water is sprayed. The invention is however not limited to such a number and arrangement of the areas. By contrast with the embodiment in FIG. 2 it can be seen here that air throttles 62 are located inside the areas 46, 47 and 48 upstream of the spraying devices 38 and 39, by means of which the passage cross-sections of the individual partial cross-sections of areas 46 to 48 can be adjusted through the control device 42. In this manner, partial air streams which can be adjusted individually to desired values are formed in the individual areas 46 to 48.

In the embodiment of FIG. 4 areas 63 and 64 are formed in the humidification zone 45 of the air humidifier 23, whereby the spraying device 38 by means of which cooled water can be sprayed in is assigned to area 64 which forms a partial cross-section. The individual adjustment of the supplied an cooled water quantity is carried out by means of valve 52 Which is controlled by the control device 42. The spraying device 39 which serves to supply tempered water for adiabatic performance of the process is designed so that it feeds tempered water to a running wheel 65 of the ventilator 14, causing the water to be atomized and to thus permeate the entire cross-section. Since the ventilator 14 precedes the area 64, air conditioned by means of tempered water reaches area 64 where conditioning may again be carried out if necessary by means of the cooled water. The partial air stream flowing through the area 63 is permeated exclusively with air conditioned by tempered water, insofar as the control device 42 controls the valve 59 accordingly. The two partial air streams unite on the way into room 2, producing a suitable air mixture.

Figure 5:
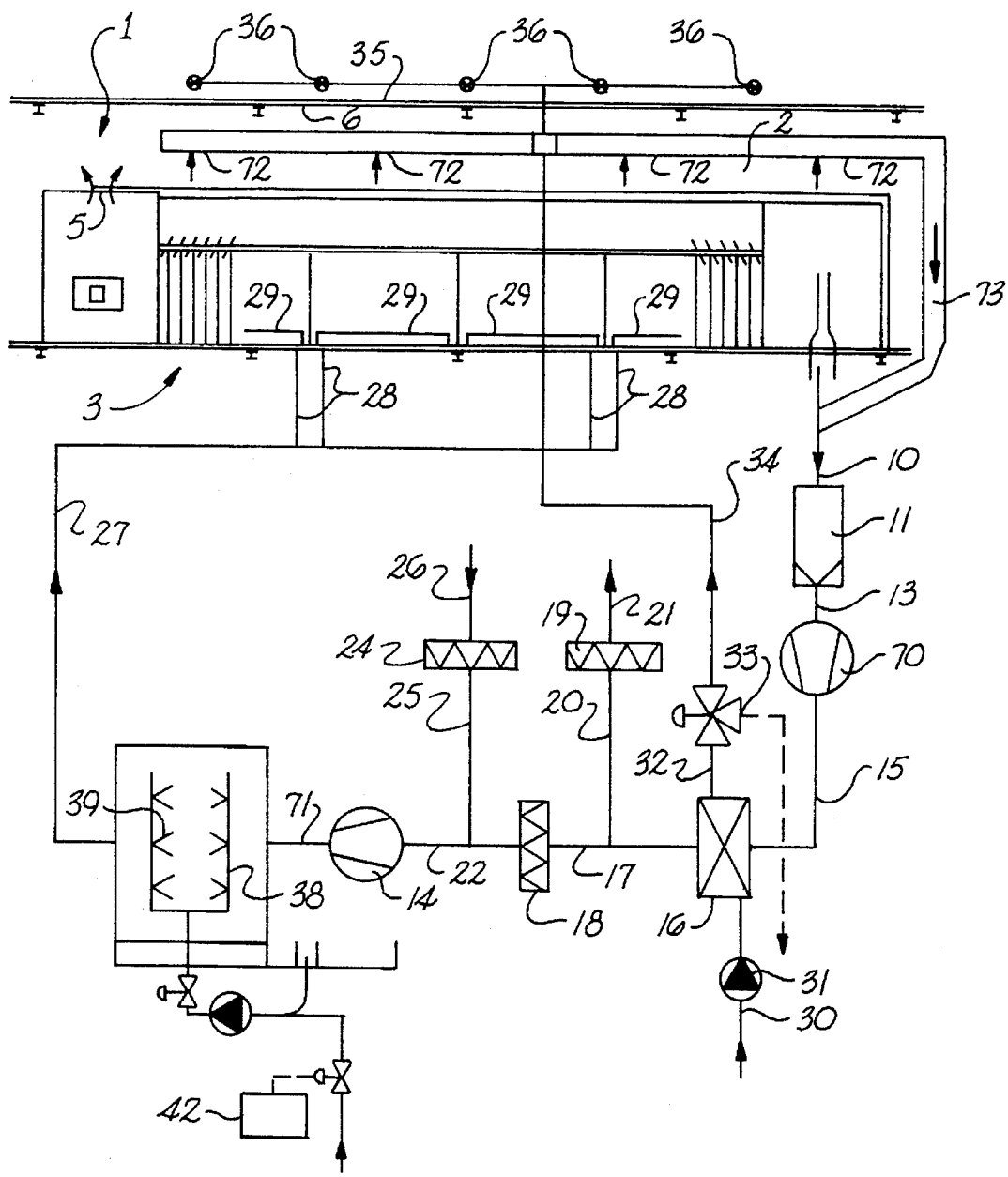
FIG. 5 shows another embodiment according to the basic plan of FIG. 1.

FIG. 5 shows an embodiment similar to that of FIG. 1, with the only difference that only, or in addition to air suction by channel 10 which leads directly to the machine 3, air removal by suction from room 2, in particular from the area near its ceiling, is carried out preferably through several air inlets 72. For this a channel 73 is provided. The roof exhausters 7 (FIG. 1) are omitted in the embodiment of FIG. 5.

According to embodiments not shown here and in deviation to the preceding examples, it is also possible to provide for a ventilator to suck the air stream through the humidification zone of the air humidifiers, i.e. this ventilator is downstream of the air humidifier. Alternatively, it is also possible for the air stream to flow through the air humidifier as a result of a blow or a suction effect, i.e. one ventilator is preferably installed upstream and one downstream.

It will be apparent to those skilled in the art that various modifications and variations can be made in the present invention without departing from the scope or spirit of the invention. For example, features illustrated or described as part of one embodiment can be used on another embodiment to yield a still further embodiment. It is intended that the present invention cover such modifications and variations as come within tire scope of the appended claims and their equivalents.

I claim:

1. A process for cooling and conditioning an air stream, comprising:

conveying the air stream through a humidification and conditioning zone, and defining at least two independent regions within the zone wherein at least a portion of the airstream flows through each region;

spraying cooled water into the portion of the air stream conveyed through one of the regions to cool the air stream;

spraying tempered water into the portion of the air stream conveyed through the other region to provide adiabatic humidification of the air stream;

independently controlling the spraying in each of the regions so as to achieve a combined air stream having desired parameters of temperature and relative humidity; and combining the air stream portions downstream of the regions.

2. The process as in claim 1, further comprising blowing the air stream through the humidification and conditioning zone.

3. The process as in claim 1, further comprising sucking the air stream through the humidification and conditioning zone.

4. The process as in claim 1, further comprising variably adjusting the air stream throughput through the humidification and conditioning zone to influence the achieved temperature and relative humidity of the air stream.

5. The process as in claim 4, further comprising maintaining the air stream throughput through one of the regions relatively constant and varying the air stream throughput through the other region.

6. The process as in claim 1, further comprising maintaining the rate of cooled water sprayed relatively constant and varying the rate of tempered water sprayed.

7. The process as in claim 1, further comprising conveying the air stream through the humidification and conditioning zone with a running wheel ventilator and spraying the tempered water upon the running wheel of the ventilator, and defining the cool water spray region downstream of the ventilator so that only a partial cross-section of the air stream from the ventilator passes through the cool water spray region.

8. An apparatus for cooling and conditioning an air stream, said apparatus comprising:

a humidifier, said humidifier further comprising a ventilator configured therewith for conveying an air stream through said humidifier;

at least two separate spraying devices configured within said humidifier and defining at least two separate spray regions within said humidifier, one of said spray devices connectable to a source of cooled water wherein its respective said spray region defines a cooling region and the other said spray device connectable to a source of tempered water wherein its respective said spray region defines an adiabatic humidification region; and a control device configured with each of said spraying devices to independently regulate the spraying in each of said regions to achieve an overall mixed air stream having a desired temperature and relative humidity.

9. The apparatus as in claim 8, wherein said spray regions are physically separated from each other.

10. The apparatus as in claim 8, wherein at least one of said spray devices comprises spray nozzles.

11. The apparatus as in claim 8, wherein said ventilator comprises a running wheel, one of said spray devices configured to spray onto said running wheel and the other said spray device disposed downstream of said ventilator and configured to spray into a partial cross section of the air stream passing through said ventilator.

12. The apparatus as in claim 8, wherein said control device further comprises a sensing device located in a room to which the air stream is to be conveyed, said sensing device conveying temperature and relative humidity to said control device wherein said control device regulates spraying in said spray regions to achieve desired conditions of temperature and relative humidity in the room.

13. The apparatus as in claim 12, further including a controllable intake for outside air disposed operably upstream of said humidifier, said control device further including a sensing device operably disposed to sense outside air temperature and relative humidity, said control device operably configure to control said intake to admix outside air with the air stream conveyed through said ventilator.

14. The apparatus as in claim 8, wherein said humidifier further comprises at least one air throttling device for regulating the air stream throughput through said humidifier.

15. The apparatus as in claim 14, wherein said air throttling device is disposed upstream of said spray devices.

* * * * *